J. B. COONROD.
ARMOR FOR VEHICLE TIRES.
APPLICATION FILED FEB. 25, 1911.
1,023,414.
Patented Apr. 16, 1912.
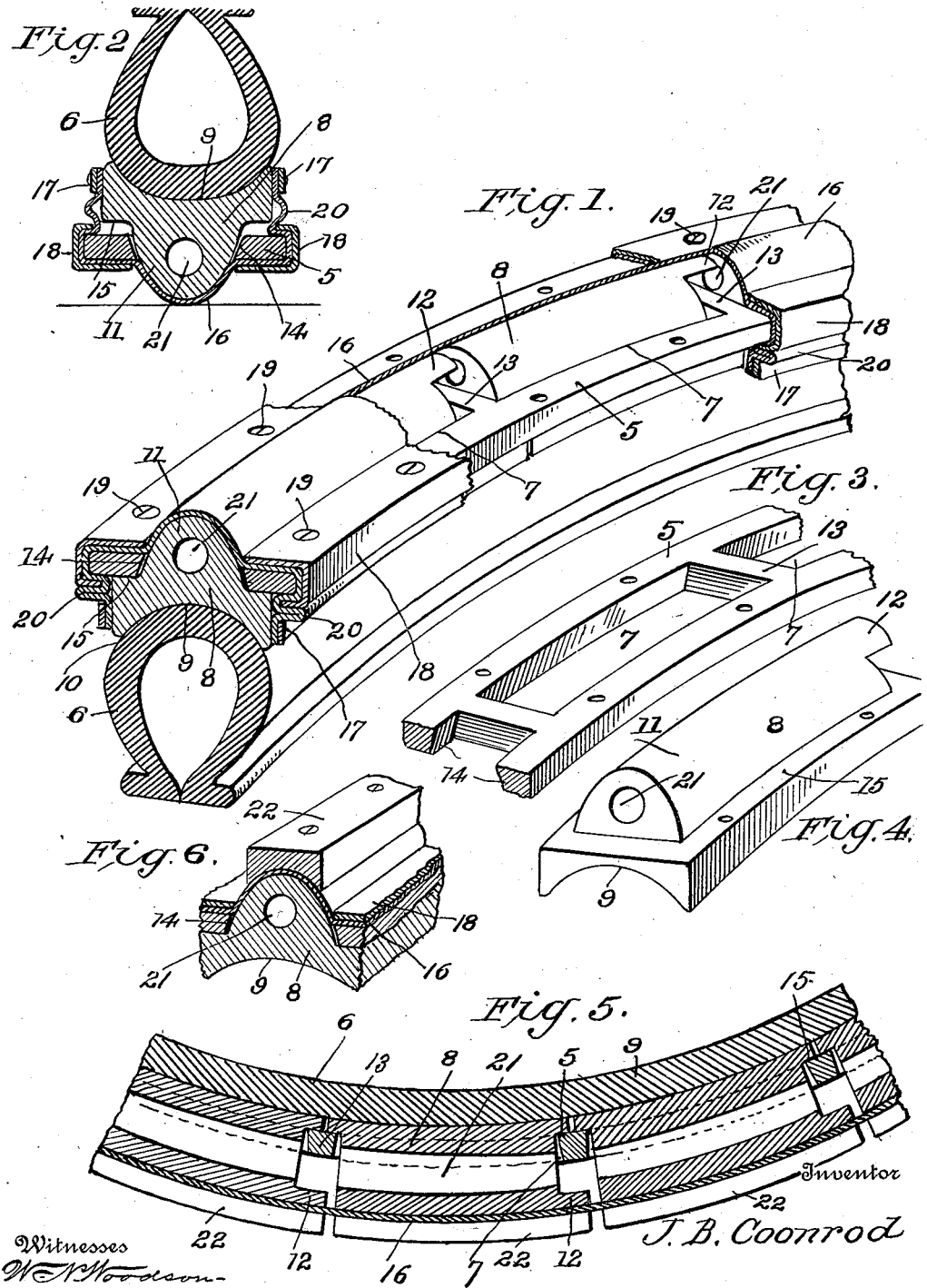

UNITED STATES PATENT OFFICE.

JEREMY B. COONROD, OF ROCK RAPIDS, IOWA.

ARMOR FOR VEHICLE-TIRES.

1,023,414.  Specification of Letters Patent.  Patented Apr. 16, 1912.

Application filed February 25, 1911. Serial No. 610,892.

*To all whom it may concern:*

Be it known that I, JEREMY B. COONROD, citizen of the United States, residing at Rock Rapids, in the county of Lyon and State of Iowa, have invented certain new and useful Improvements in Armor for Vehicle-Tires, of which the following is a specification.

This invention relates to vehicle wheels and more particularly to a protective casing or armor especially designed for attachment to pneumatic, cushion and other resilient tires.

The object of the invention is to provide an armor capable of being readily attached to an ordinary pneumatic or cushion tire and which will effectually protect the tire against abrasions and puncture and at the same time prevent skidding when the roadway is slippery or when the vehicle is rounding a curve.

Further objects and advantages will appear in the following discription, it being understood that various changes in form, proportions and minor details of construction may be resorted to within the scope of the appended claims.

For a full understanding of the invention and the merits thereof, reference is to be had to the following description and accompanying drawings, in which:

Figure 1 is a sectional perspective view of a portion of a pneumatic tire provided with a protective casing or armor constructed in accordance with the present invention, a part of the flexible covering being broken away in order to more clearly show the interior construction thereof; Fig. 2 is a transverse sectional view, showing one of the tread pieces in contact with the ground and the relative movement between the tread pieces and supporting member; Fig. 3 is a perspective view of a portion of the supporting member or ring; Fig. 4 is a perspective view of one of the tread pieces or blocks, detached; Fig. 5 is a longitudinal sectional view of Fig. 1; Fig. 6 is a sectional perspective view illustrating a modified form of the invention.

Corresponding and like parts are referred to in the following description and indicated in all the views of the drawings by the same reference characters.

The improved armor forming the subject matter of the present invention comprises a supporting member or ring 5, preferably rectangular in cross section and formed of metal or other suitable material, said supporting member being adapted to embrace the tread surface of an ordinary pneumatic or cushion tire, indicated at 6. The supporting member 5 is provided with spaced longitudinal seating recesses 7 for the reception of vertically movable tread pieces or blocks 8, which latter extend entirely around the tire and form an auxiliary tread surface for the same. The lower face of each block 8 is concaved at 9 for engagement with the convex tread surface 10 of the resilient tire 6, while the upper face of each block is formed with a rib 11 which projects through the supporting member 5 and is provided at one end thereof with a longitudinally disposed lip 12 which partially overlaps the adjacent connecting web 13 of the supporting member so as to form in effect a continuous tread surface. The ribs 11 are substantially conical in cross section, while the side walls of the recesses 7 are undercut at 14 to permit free movement of the blocks within said recesses without undue friction between the parts. The rib 11 of each tread surface or block is preferably of less width than the body thereof so as to produce a square circumferential shoulder 15 adapted to bear against the lower face of the supporting member 5 for limiting the outward movement of said blocks, the inward movement of the blocks being limited by contact of the lips 12 with the adjacent connecting webs 13.

Extending over the ribs 11, is a flexible covering 16 formed of canvas, leather, rubber or other suitable material, the opposite longitudinal edges of which extend over the adjacent edges of the supporting member 5 for engagement with the tread pieces or blocks 8, thus to prevent the entrance of dust and other foreign matter to the movable parts of the armor. The opposite edges of the flexible covering 16 are secured to the blocks 8 by retaining members 17, which latter may be made in sections or in the form of a continuous band.

Disposed on opposite sides of the tire and embracing the adjacent longitudinal edges of the supporting member 5, are substantially U-shaped clamping members 18, which latter bear against the flexible covering 16 and serve to hold said covering under tension when the ribs 11 are projected through the recesses 7 and also serve to prevent the covering from coming in contact with the road bed and cutting or otherwise destroying said covering.

The clamping members 18 may be formed of spring metal in which event, they will be retained in position on the supporting member by their inherent spring properties, but it is preferred to rigidly secure the clamping members in position on the supporting member by screws or similar fastening devices 19.

It will here be noted that that portion of the covering between the clamping members 18 and retaining members 17 is provided with one or more folds 20 so as to permit the tread members to slide freely within the recesses 7 without danger of accidentally detaching the covering from said tread pieces. The tread pieces may be formed of metal, rubber or other suitable material, and for sake of lightness, the ribs of said tread pieces or blocks are preferably provided each with a longitudinal bore 21.

Particular attention is here called to the fact that the lip 12 of each tread piece or block is spaced a short distance from the end of an adjacent block so as to permit said block to move independently of each other, said lips serving to bridge the connecting webs and thus present a continuous tread surface. It will also be noted that the opposite longitudinal edges of the supporting member 5 project laterally beyond the adjacent sides of the tire 6 so as to receive the shock or jar incident to the tire striking a projection in the road bed, thereby forming in effect a guard and serving to prevent damage to the sides of said tire. Thus it will be seen that as the wheel revolves and the ribs 11 of the tread members or blocks are successively presented to the ground, the weight of the vehicle will force the blocks inwardly against the tension of the tire 6, as best shown in Fig. 1 of the drawings, and that as the wheel continues to revolve, the air within the tire 6 will force the blocks outwardly until they assume the position shown in Fig. 1 of the drawings.

If desired, suitable shoes 22 may be secured to the ribs 11 of the tread members so as to assist in preventing skidding of the wheel when traveling on wet ground or rounding a curve. It will of course be understood however, that the tires may be made with or without the shoes 22, without departing from the spirit of the invention.

Having thus described the invention, what is claimed as new is:

1. An armor for resilient tires including a supporting member having spaced recesses therein, tread pieces seated in said recesses for engagement with the tread surface of the tire, and a covering extending over the outer faces of the tread pieces and the adjacent longitudinal edges of the supporting member and secured to the tread pieces inwardly of said supporting member.

2. An armor for resilient tires, including a supporting member having spaced recesses therein, tread pieces slidably mounted in said recesses, a covering extending over the outer faces of the tread pieces and adjacent longitudinal edges of the supporting member, angular clamping members embracing the upper and lower faces of the supporting member and bearing against the covering for securing said covering to the supporting member, and retaining bands independent of the clamping members for securing the covering to the tread pieces inwardly of said supporting member.

3. An armor for resilient tires including a supporting member having spaced recesses therein, tread pieces adapted to rest on the tire and projecting through said recesses, a covering extending over the projecting ends of the tread pieces and the adjacent longitudinal edges of the supporting member, clamping members for securing the covering to said supporting member, and retaining bands independent of the clamping members for securing said covering to the tread pieces inwardly of said supporting member, there being folds formed in the covering on opposite sides of the armor between said clamping members and retaining bands to permit free movement of the tread pieces with respect to the supporting member.

In testimony whereof, I affix my signature in presence of two witnesses.

JEREMY B. COONROD. [L. S.]

Witnesses:
 JOHN A. KEETH,
 G. F. McBURNRY.

---

Copies of this patent may be obtained for five cents each, by addressing the "Commissioner of Patents, Washington, D. C."